3,098,830
POLYMERIC SILAZANES
Eugene G. Rochow, Winchester, Mass., assignor to General Electric Company, a corporation of New York
No Drawing. Filed Apr. 14, 1961, Ser. No. 102,926
17 Claims. (Cl. 260—2)

The present invention relates to certain organosilicon polymers and to their preparation. More particularly, this invention relates to cross-linked polymeric silazanes and their method of preparation.

Many cross-linked organosilicon polymers are known in the art. However, prior to the present invention, these cross-linked organic silicon materials contained groups or chains of silicon atoms and other atoms and were cross-linked through siloxane linkages or through silicon-bonded alkylene radicals. The present invention is based on our discovery of a new type of cross-linked organic silicon compound in which cross-linking is effected through nitrogen atoms in the organosilicon polymer chain rather than through silicon atoms. These cross-linked polymeric materials of the present invention exhibit outstanding thermal stability and dielectric properties and are particularly useful in those applications where both thermal stability and high dielectric strength is required. These materials are particularly valuable as dielectric materials for use in electrical capacitors.

The polymeric organosilicon compounds of the present invention can be described as polymeric silazanes comprising two silazane chains, each of which consists of a plurality of alternate silicon and nitrogen atoms with each silicon atom in each of said chains containing two silicon-bonded monovalent hydrocarbon radicals and with the nitrogen atoms of the first silazane chain being attached to the nitrogen atoms of the second silazane chain through at least two carbon atoms. These carbon atoms are generally carbon atoms present in a divalent hydrocarbon radical. The cross-linked polymeric silazanes of the present invention have the repeating unit:

(1) 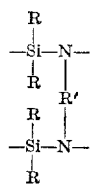

where R is a monovalent hydrocarbon radical and R' is a divalent hydrocarbon radical. The cross-linked polymeric silazanes of the present invention consist of a plurality of the units shown in Formula 1. In general, the polymeric materials contain from about 5 to 150 or more, and preferably from about 5 to 25 of the units of Formula 1. For a further illustration of the method by which these units are connected to each other there is shown below two of the units of Formula 1 which are joined together.

(2) 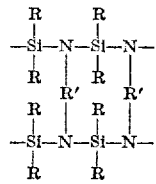

where R and R' are as previously defined. As is seen from the combined units of Formula 2, the cross-linked polymeric silazanes of the present invention have a ladder-like structure in which the divalent hydrocarbon radicals R' form the "rungs" between nitrogen atoms in the respective silazane chains.

The cross-linked polymeric silazanes of the present invention are prepared by effecting reaction between certain diorganosilylamine polymers and certain metal chlorides. In turn, the diorganosilylamine polymers are prepared by effecting reaction between certain organosilanes and certain diamines. In particular, the diorganosilylamine polymers have the formula:

(3) 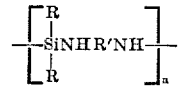

where R and R' are as previously defined and $n$ has a value equal to from about 5 to 150 or more. The diorganosilylamine polymers of Formula 3 are formed by reacting a hydrolyzable diorganosilane having the formula:

(4) 

where R is as previously defined and X is halogen, preferably chlorine, with a diamine having the formula:

(5) 

where R' is as previously defined.

Illustrative of the monovalent hydrocarbon radicals represented by R are alkyl radicals, e.g., methyl, ethyl, propyl, butyl, octyl, etc. radicals; aryl radicals, e.g., phenyl, naphthyl, xylyl, tolyl, etc. radicals; aralkyl radicals, e.g., benzyl, phenylethyl, etc. radicals; alkenyl radicals, e.g., vinyl, allyl, etc. radicals; cycloalkyl radicals, e.g., cyclohexyl, cycloheptyl, etc. radicals; cycloalkenyl radicals, e.g., cyclohexenyl, etc. radicals. Illustrative of the divalent hydrocarbon radicals free of olefinic unsaturation represented by R' are alkylene radicals, e.g., ethylene, trimethylene, isobutylene, hexamethylene, etc. radicals; cycloalkylene radicals, e.g., cyclohexylene, cycloheptylene, etc. radicals; arylene radicals, e.g., m-phenylene, p-phenylene, tolylene radicals, etc.

Illustrative of the specific diorganodihalogenosilanes within the scope of Formula 4 are dimethyldichlorosilane, diphenyldichlorosilane, dicyclohexyldichlorosilane, divinyldichlorosilane, dioctyldichlorosilane, methylphenyldichlorosilane, methylcyclohexyldichlorosilane, methylallyldichlorosilane, methylnaphthyldichlorosilane, etc. Illustrative of the diamines within the scope of Formula 5 are ethylene diamine, propylene diamine, hexamethylene diamine, m-phenylene diamine, p-phenylene diamine, 1,4-diaminocyclohexane, etc.

The diorganosilylamine polymers employed in the practice of the present invention are prepared by reacting the diorganodihalogenosilane of Formula 4 with the diamine of Formula 5 by heating the two reactants together. Desirably, the reaction between the diorganodihalogenosilane and the diamine is carried out in the presence of a suitable solvent for the expected diorganosilylamine polymer. Suitable solvents for this reaction include, for example, both aromatic and aliphatic hydrocarbon solvents such as benzene, toluene, xylene, naphthylene and the aliphatic and aromatic mineral spirits or any other solvent which is inert to the reactants under the conditions of the reaction. The two principal products of the reaction between the diorganodihalogenosilane and the diamine are the polymeric diorganosilylamine of Formula 3 and the dihydorchloride of the diamine. Because the stoichiometry of the reaction involves two moles of the diamine per mole of the diorganodihalogenosilane, it is preferred to employ the reactants in this ratio. However, excesses of either reactant can be employed. For example, satisfactory results can be obtained employing from about 1.75 to 2.25 moles of the diamine of Formula 5 per mole of the diorganodihalogenosilane of Formula 4.

Because the reaction between the diorganodihalogenosilane and the diamine is highly exothermic and to avoid the formation of cyclic products, it is preferred to slowly add one of the reactants to the other to prevent an undesirable temperature buildup in the reaction mixture. This undesirable temperature buildup can also be controlled by employing intermittent cooling of the reaction mixture. As a matter of convenience, it is preferred to mix the diamine with a portion of the solvent employed for the reaction and then slowly add the diorganodihalogenosilane to the reaction mixture. The rate of addition of the diorganodihalogenosilane and the rate of cooling of the reaction mixture is adjusted so as to maintain the temperature of the reaction mixture during the addition in the range of from about 40 to 70° C. However, temperatures outside of this range can be employed. After completing the addition of the diorganodihalogenosilane to the diamine and solvent, the reaction mixture is then heated further, for example, at a temperature of from about 90° C. up to the reflux temperature of solvent so as to increase the molecular weight of the diorganosilylamine polymer to the desired point. In general, this heating is completed in a matter of from a few minutes up to 24 hours or more. The ratio of solvent to reactants can vary within extremely wide ranges. However, satisfactory results are obtained when the solvent is present in an amount equal to from about 5 parts by weight to 50 parts by weight, based on the weight of the diorganodihalogenosilane, preferably from 10 to 20 parts by weight of the solvent are employed per part of the diorganodihalogenosilane.

At the conclusion of the reaction, the resultant diorganosilylamine polymer within the scope of Formula 3 is principally present as a solution in the reaction solvent and the dihydrochloride of the diamine, together with some high polymer, is found as a precipitate. This precipitate is filtered from the reaction mixture to yield a solution of the diorganosilylamine polymer in the reaction solvent. This diorganosilylamine polymer can be isolated, if desired, by distilling the solvent from the solution, preferably at reduced pressures. The resulting isolated diorganosilylamine polymer can vary from a high viscosity fluid to a brittle, resinous mass, depending upon the particular organo groups, the particular amine employed and the molecular weight of the final product. While the polymeric material can be isolated from the reaction solvent as described above, such isolation is not necessary since, as will be explained in detail later, in the preferred method of preparing the cross-linked diorganosilazane polymers of the present invention, the diorganosilylamine polymer is employed in solution, and the reaction solvent employed in forming the diorganosilylamine polymer is a satisfactory solvent for the reaction to form the cross-linked silazane.

At least one of the diorganosilylamine polymers within the scope of Formula 3 is known in the art. The diorganosilylamine polymers prepared by reacting dimethyldichlorosilane with ethylene diamine are described by F. A. Henglein and K. Lienhard in Makromal. Chem., 32, 218 (1959). The diorganosilylamine polymers prepared by reacting diphenyldichlorosilane with ethylene diamine and other aliphatic diamines are described in my copending application Serial No. 102,928, filed concurrently herewith and assigned to the same assignee as the present invention. The diorganosilylamine polymers prepared by reacting dicyclohexyldichlorosilane with ethylene diamine and other aliphatic diamines are described in my copending application Serial No. 102,925, also filed concurrently herewith and assigned to the same assignee as the present invention.

The cross-linked silazane polymers having the units shown in Formula 1 are formed by reacting the diorganosilylamine polymer of Formula 3 with certain metal chlorides which are capable of splitting out the diamine from the silylamine chains. Included among the operative metal salts are copper chloride, $CuCl_2$, nickel chloride, $NiCl_2$, thorium chloride, $ThCl_4$, and cobalt chloride, $CoCl_2$. While the exact mechanism of the reaction between the diorganosilylamine and the metal chloride is not known with certainty, the net result of the reaction is set out in the equation below which, for purposes of clarity, shows the conversion of two units of each of two diorganosilylamine polymers to the cross-linked silazane,

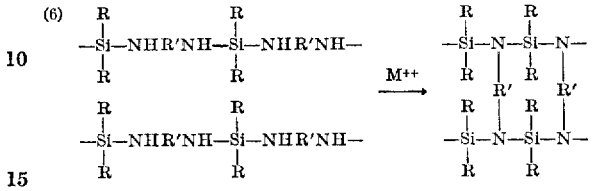

where R and R' are as previously defined. M represents (in this case) a divalent metal ion.

As is shown by Equation 6, one of the results of the reaction of the present invention is the splitting out of the diamine from the diorganosilylamine polymer. This diamine which is split out of the polymer coordinates with the metal chloride employed as a cross-linking agent and forms a complex therewith. The ratio of the metal chloride to the diorganosilylamine polymer can vary within wide limits. Satisfactory cross-linked silazane polymers can be formed employing from 0.005 to 1.0, and preferably from 0.01 to 0.1 mole of the metal chloride per mole of silicon atoms in the diorganosilylamine polymer.

In effecting reaction between the diorganosilylamine polymer and the metal chloride, intimate mixing of the metal chloride and the diorganosilylamine polymer is desired to effect as complete reaction as possible. Since the diorganosilylamine polymers are very viscous fluids or hard, brittle materials, reaction is best effected by reacting solutions of the diorganosilylamine polymer with the metal chloride. As previously explained, these solutions can contain as a solvent the solvent in which the diorganosilylamine polymer has been formed. However, if desired, the diorganosilylamine polymer can be first stripped of solvent and later redissolved in the same solvent or some other solvent for reaction with the metal chloride.

The solvents suitable for effecting reaction between the diorganosilylamine polymer and the metal chloride are identical to those solvents previously mentioned for the reaction involving the formation of the silylamine polymer. In particular, useful solvents are benzene, toluene, xylene and both the aromatic and aliphatic mineral spirits. The amount of solvent employed in the reaction can vary within extremely wide limits, with suitable results being obtained when the solvent is present in an amount equal to from about 2 to 20 times the weight of the diorganosilylamine polymer.

The reaction is effected by merely mixing the desired metal chloride with the diorganosilylamine polymer solution and maintaining the mixture at an elevated temperature until the cross-linking reaction is effected. Suitable elevated temperatures are temperatures of from about 50 to 150° C. One convenient method of carrying out the reaction is to simply boil the mixture of the metal chloride and the diorganosilylamine polymer solution. The time required for the reaction varies depending on a number of factors such as the particular diorganosilylamine polymer employed as a reactant, the amount of solvent present, the particular solvent present and the amount and nature of the particular metal chloride present and its solubility in the solvent employed. In general, satisfactory cross-linking is obtained at times which vary from about one to twenty-four or more hours.

One observed characteristic of the cross-linking reaction is that the cross-linked silazane molecules do not always contain exactly twice as many silicon atoms as the starting diorganosilylamine polymer molecules. From the stoichiometry of the reaction, this 2:1 ratio would be expected. However, in practice it is found that the cross-linked silazane polymer can contain more or fewer than twice the number of silicon atoms per molecule present in the starting diorganosilylamine polymer molecules. This results from the joining together of a plurality of cross-linked silazane molecules through the formation of new silicon-nitrogen linkages and by the rupture of silicon-nitrogen linkages during the cross-linking reaction.

In general, where the organic groups of the diorganosilylamine polymer are lower aliphatic hydrocarbon radicals, the resulting cross-linked silazane contains more than two times the number of silicon atoms per molecule as did the molecules of the starting diorganosilylamine polymer. On the other hand, where the organo groups of the diorganosilylamine are aromatic, the number of silicon atoms per molecule of the cross-linked silazane is slightly less than twice the number in the diorganosilylamine polymer molecules.

After heating the diorganosilylamine polymer with the metal chloride in the solvent for a time sufficient to produce the cross-linked silazane, the reaction mixture will have at least two phases. The first of these phases is a solid phase which comprises principally the diamine and the diamine-metal chloride complex. The second phase will be a solution of the desired cross-linked silazane. It is possible in some cases to have a third phase which is a liquid or semi-solid coordination complex between the metal ion and the cross-linked silazane polymer. The reaction mixture is first filtered to remove the solid phase or phases and if two liquid phases are present, they are separated from each other. The phase which consists of the solution of the silazane polymer is then separated and the cross-linked silazane polymer is then isolated by evaporation of the solvent. This isolation of the cross-linked silazane polymer can be effected when it is desired to store the silazane polymer for later use. For some applications which will be described hereafter, removal of the solvent can be effected during the application of the cross-linked silazane polymer for its intended use.

The following examples are illustrative of the practice of my invention and are not intended for purposes of limitation. Except where otherwise indicated, all parts are by weight.

*Example 1*

This example illustrates the preparation of a dimethylsilylamine polymer useful as a starting material in practicing the process of the present invention. A reaction vessel equipped with a stirrer and a reflux condenser was purged with dry nitrogen and 115 grams of anhydrous ethylene diamine diluted with 400 ml. of xylene was added. To the reaction vessel was then added 121.5 grams of dimethyldichlorosilane diluted with 150 ml. of xylene. This dimethyldichlorosilane was added with stirring over a 45 minute period and an ice bath was used to keep the temperature of the reaction mixture between 45 and 50° C. After all of the chlorosilane had been added, stirring was continued until the temperature of the reaction mixture began to drop. The reaction vessel was then gradually warmed to the reflux temperature of xylene (about 140° C.). At about 85° C. the amine hydrochloride from the reaction began to congeal to a yellow mass, and by the time the temperature of the reaction vessel had reached the boiling point of xylene the solution was a clear, pale yellow. Refluxing was continued for 30 additional minutes and the contents allowed to cool. The solution was filtered to remove the amine hydrochloride and about 250 ml. of xylene was distilled from the filtrate at 35 millimeters to remove any trace of excess reactants. The remaining solution was made up to 500 ml. with fresh xylene. A 15 ml. portion of this solution was stripped of xylene at reduced pressures to give 2.517 grams of dimethylsilylamine polymer as a viscous, sticky fluid. The total yield of polymer was 76.5% of the theoretical. This polymer had the formula:

(7) 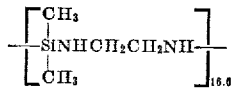

The molecular weight of this material, determined cryoscopically in cyclohexane, was found to be 1940. Chemical analysis of the polymer showed the presence of 41.38% carbon, 10.19% hydrogen, 24.04% silicon and 24.26% nitrogen as compared with the theoretical values of 41.32% carbon, 10.41% hydrogen, 24.40% silicon and 24.10% nitrogen.

*Example 2*

This example describes the preparation of a cross-linked silazane employing cupric chloride as the metal chloride. To a reaction vessel was added 150 ml. of a xylene solution containing 22.65 grams of the dimethylsilylamine polymer of Example 1 and 1.215 grams of anhydrous cuprous chloride. The mixture was refluxed at a temperature of about 140° C. for five hours. During this time the solution became deeper yellow in color and the cupric chloride turned dark brown. After cooling there were three distinct layers, an upper tan layer, an intermediate greenish layer and a brown solid residue at the bottom. The upper layers were decanted off the brown solid and were separated in a centrifuge, the greenish layer forming a blue gelatinous material in the bottom of the centrifuge. The upper layer, yellow-tan in color, was decanted off the gelatinous material and, when stripped of solvent, yielded 15.10 grams of a firm, waxy cross-linked silazane having the formula:

(8) 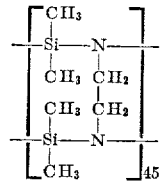

Chemical analysis of this material showed the presence of 42.5% carbon, 8.8% hydrogen, 30.5% silicon and 15.8% nitrogen as compared with the theoretical values of 41.80% carbon, 9.36% hydrogen, 32.59% silicon and 16.25% nitrogen. The molecular weight of this material as determined by the Rast method was 7800.

*Example 3*

This example illustrates the preparation of a cross-linked silazane polymer employing nickel chloride. Following the procedure of Example 2, 1.45 grams of anhydrous nickel chloride, NiCl$_2$, was refluxed with 75.0 ml. of a xylene solution containing 12.58 grams of the dimethylsilylamine polymer of Example 1. After refluxing for 24 hours, a solid phase and liquid phase were present in the reaction mixture. The solid phase, which was the nickel chloride-ethylene diamine complex, was filtered from the reaction mixture and the xylene was stripped from the filtrate at reduced pressure to give 10.3 grams of a material which was still mobile but which was thicker than the starting dimethylsilylamine polymer. This material had the same structural units of the cross-linked silazane of Example 2, except this material was lower in molecular weight than the material of Example 2. Chemical analysis of the product showed the presence of 43.7% carbon, 9.34% hydrogen, 16.5% nitrogen and 30.4% silicon as compared with the theoretical values of 41.80% carbon, 9.36% hydrogen, 16.25% nitrogen and 32.59% silicon.

*Example 4*

This example illustrates the use of thorium chloride in preparing cross-linked silazanes of the present invention. Following the procedure of Example 2, 2.59 grams of anhydrous ThCl$_4$ were refluxed with 75 ml. of a xylene solution containing 11.3 grams of dimethylsilylamine polymer of Example 1. After refluxing for seven hours, the reaction mixture was cooled and a solid precipitate was removed by filtration and the filtrate was stripped of xylene to yield 9.16 grams of a solid, waxy polymer substantially identical in appearance to the cross-linked polymer prepared in Example 2. Chemical analysis of this material showed the presence of 44.1% carbon, 9.7% hydrogen, 15.9% nitrogen and 30.2% silicon as compared with the theoretical values of 41.80% carbon, 9.36% hydrogen, 16.25% nitrogen and 32.59% silicon. The high values for carbon and hydrogen were due to incomplete stripping of xylene from the cross-linked silazane.

*Example 5*

This example illustrates the use of cobalt chloride in preparing the cross-linked silazanes of the present invention. Following the procedure of Example 2, 75 ml. of a xylene solution containing 12.6 grams of the dimethylsilylamine polymer of Example 1 was added to 6.1 grams of anhydrous CoCl$_2$ and the resulting suspension was refluxed for six hours, cooled, and the solid material was removed by suction filtration. The filtrate was then stripped of xylene to produce 8.85 grams of a cross-linked silazane containing 3.45% by weight of cobalt, presumably as a cobalt chloride complex of the polymer. This material was a dark blue, waxy solid having substantially the same structure as the cross-linked silazane of Example 2, except for the presence of the cobalt. Assuming the cobalt in the polymer present as cobalt chloride, the theoretical analysis for the polymer is 3.45% cobalt, 4.15% chlorine, 38.6% carbon, 8.6% hydrogen, 15.0% nitrogen and 30.1% silicon. Chemical analysis showed the presence of 3.45% cobalt, 3.8% chlorine, 39.68% carbon, 8.83% hydrogen, 14.26% nitrogen and 24.98% silicon.

*Example 6*

This example illustrates the preparation of a diphenylsilylamine polymer for use as a starting material in the preparation of the cross-linked silazanes of the present invention. To a reaction vessel equipped with a stirrer and reflux condenser was added 100 grams of anhydrous ethylene diamine and 500 ml. of xylene. To this reaction vessel was then slowly added 211 grams of diphenyldichlorosilane diluted with 100 ml. of xylene. The rate of addition and intermittent cooling were adjusted to keep the contents of the reaction vessel between 45 and 50° C. After about four-fifths of the diphenyldichlorosilane had been added, the bulk of the amine hydrochloride caused the suspension to become too stiff for stirring, so 300 ml. additional xylene was added and then the remainder of the diphenyldichlorosilane was added. The reaction vessel was then gradually warmed and at 90° C. the contents of the reaction vessel became too stiff to stir so another 400 ml. of xylene was added and heating continued. When the temperature reached 100° C., the suspension turned pale yellow and a solid material gradually coagulated. This solid material was the dihydrochloride of ethylene diamine together with some high molecular weight polymer. The mixture was then refluxed at the boiling point of xylene (about 140° C.) for five minutes and the precipitate settled out to leave a clear solution. The precipitate was separated by suction filtration and the xylene solvent was evaporated from the filtrate to produce 186.5 grams of a hard, brittle, resinous diphenylsilylamine polymer having the formula:

(9)

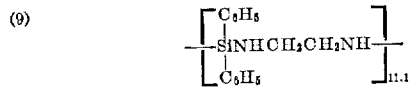

Chemical analysis of this material showed the presence of 70.06% carbon, 6.92% hydrogen, 11.68% nitrogen and 11.41% silicon as compared with the theoretical values of 69.95% carbon, 6.71% hydrogen, 11.66% nitrogen and 11.69% silicon. The molecular weight of this polymer was determined cryoscopically in cyclohexane to be 2650.

*Example 7*

This example illustrates the preparation of a cross-linked silazane from the diphenylsilylamine polymer of Example 6. To a reaction vessel was added 75 ml. of a xylene solution containing 22.1 grams of the diphenylsilylamine polymer of Example 6 and 1.42 grams of anhydrous cupric chloride. As soon as the diphenylsilylamine polymer was added to the cupric chloride, there was a mild warming of the reaction mixture and a portion of the copper salt turned bluish purple. The suspension was refluxed for six hours, a precipitate was removed by filtration, and the xylene was stripped from the filtrate at reduced pressures to yield a brittle, resinous, cross-linked silazane having the formula:

(10)

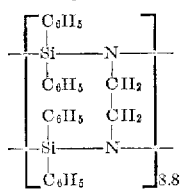

Chemical analysis of this material showed the presence of 73.77% carbon, 6.26% hydrogen, 6.99% nitrogen and 13.23% silicon as compared with the theoretical values of 74.23% carbon, 5.75% hydrogen, 6.66% nitrogen and 13.36% silicon. The molecular weight of this material was determined cryoscopically in cyclohexane to be at least 3720.

*Example 8*

This example illustrates the preparation of a diorganosilylamine polymer in which the organo groups are cyclohexyl radicals. To a reaction vessel were added 20.2 grams of anhydrous ethylene diamine and 200 ml. xylene. To this mixture was added 44.5 grams of dicyclohexyldichlorosilane diluted with 50 ml. of xylene. The rate of addition of the dicyclohexyldichlorosilane and the rate of cooling were controlled so that the temperature of the reaction mixture was maintained at from 40 to 50° C. After addition of all of the chlorosilane, the reaction mixture was refluxed at about 140° C. for two hours during which time the amine hydrochloride coagulated to leave a clear, supernatant liquid. The amine hydrochloride was filtered from the liquid and distillation of the xylene from the filtrate at 35 millimeters yielded 41.3 grams of a brittle dicyclohexylamine polymer consisting essentially of the following recurring units:

(11)

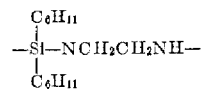

Chemical analysis of this material showed the presence of 66.9% carbon, 11.3% hydrogen, 10.6% nitrogen and 11.3% silicon as compared with the theoretical values of 66.61% carbon, 11.18% hydrogen, 11.10% nitrogen and 11.3% silicon. A solid, cross-linked silazane polymer consisting essentially of the recurring units:

(12)

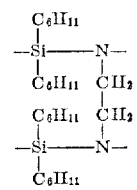

is prepared by mixing 75 ml. of a xylene solution containing 15 grams of the dicyclohexylsilylamine polymer with 1.8 grams of anhydrous cupric chloride and refluxing the mixture for twenty-four hours. At the end of this time the precipitate which forms is filtered from the reaction mixture and the xylene solvent is distilled from the filtrate to produce the cross-linked dicyclohexylsilazane polymer.

Example 9

This example illustrates the preparation of a methylvinylsilylamine polymer and the conversion of this polymer to a cross-linked silazane. To a reaction vessel is added 200 grams of anhydrous p-phenylene diamine and 600 ml. of xylene. One hundred twenty-five grams of methylvinyldichlorosilane in 300 ml. xylene is slowly added to the reaction mixture while the reaction mixture is intermittently cooled to maintain its temperature at 60° C. At the end of this time the reaction mixture is heated at a temperature of about 140° C. for three hours, during which time the dihydrochloride of p-phenylenediamine precipitates from the reaction mixture leaving a clear solution. The precipitate is removed and the xylene is stripped from the filtrate yielding a polymeric methylvinylsilylamine polymer consisting essentially of the following recurring structural units:

(13)
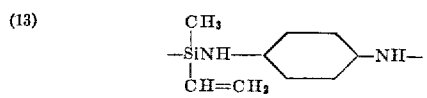

A cross-linked silazane consisting essentially of the following recurring structural units

(14)
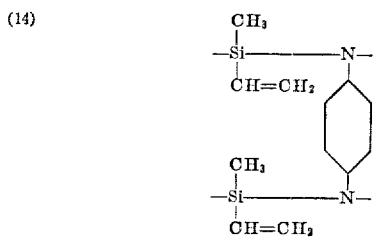

is prepared by dissolving 25 grams of the methylvinylsilylamine polymer in 150 ml. of benzene and refluxing this solution with 5 grams of anhydrous cupric chloride for twenty-four hours. At the end of this time the reaction mixture contains a precipitate and a solution of the cross-linked silazane in benzene. The benzene is stripped from the reaction mixture yielding a waxy polymeric material having the repeating units described above.

Example 10

This example illustrates the preparation of a methylphenylsilylamine polymer and the conversion of this polymer to a cross-linked silazane. To a reaction vessel is added 200 grams of anhydrous hexamethylenediamine and 500 ml. xylene. To the reaction vessel is then slowly added 75 grams of methylphenyldichlorosilane diluted with 100 ml. of xylene. The rate of addition is controlled and intermittent cooling is applied so as to maintain the reaction mixture at a temperature of about 40° C. during the addition period. The reaction mixture is then heated at a temperature of 90° C. for three hours to produce a clear solution having a precipitate therein which is the dihydrochloride of the hexamethylenediamine. This is filtered and the filtrate is evaporated under reduced pressures to produce a methylphenylsilylamine polymer consisting essentially of the following recurring structural units:

(15)
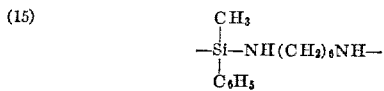

Thirty grams of this polymer are dissolved in 150 ml. xylene and 8.5 grams of anhydrous cupric chloride are added and the reaction mixture is heated at a temperature of 100° C. for sixteen hours. At the end of this time a precipitate forms. This precipitate is removed and the xylene is stripped from the filtrate at 30 millimeters to yield a hard, brittle, cross-linked silazane which consists essentially of the following recurring structural units:

(16)
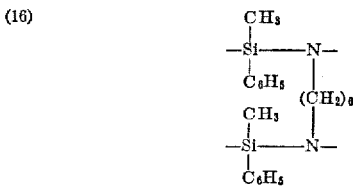

While the foregoing examples have illustrated the preparation of a number of silazanes within the scope of the present invention, it should be understood that the present invention relates broadly to the reaction between a broad class of diamines within the scope of Formula 5 with the broad class of diorganodihalogenosilanes of Formula 4 to produce the diorganosilylamine polymers of Formula 3. These diorganosilylamine polymers of Formula 3 are reacted with the appropriate metal salts to produce a broad variety of diorganosilazanes having the recurring units of Formula 1.

The cross-linked silazanes of the present invention are useful in a number of applications where their properties of high thermal stability and high dielectric strength can be employed. For example, these cross-linked silazanes are useful as insulation for electrical conductors. A convenient method of forming these insulated electrical conductors is by passing an electrical conductor, such as a copper conductor, through a solution of the cross-linked silazane and then passing the wire coated with the solution through an oven where the solvent is evaporated, resulting in a thin film of the cross-linked silazane surrounding the electrical conductor. Suitable conductors can be formed by passing a conductor through a solution containing about 35% resin solids in a suitable solvent such as toluene or xylene and then evaporating the solvent from the conductor at a temperature of the order of about 150 to 175° C. The cross-linked silazanes of the present invention are also useful as dielectric materials for electrical capacitors. These electrical capacitors can be formed by casting a solution of the cross-linked silazane on one electrode of the capacitor, evaporating the solvent to produce a film of the cross-linked silazane on the electrode and adding the second electrode to form the electrical capacitor.

In addition, the cross-linked silazanes of the present invention can be further cross-linked by the use of organic peroxides such as benzoyl peroxide, dicumyl peroxide, di-t-butyl peroxide and the like. Where these materials are cross-linked with peroxides, it is desirable to extend these cross-linked silazanes with a suitable filler such as carbon black, diatomaceous earth, calcium carbonate and the finely divided silica aerogels, precipitated silicas and fumed silicas. For example, the cross-linked silazane prepared in Example 2 can be milled with finely divided silica aerogels in the ratio of 2 parts by weight of the cross-linked silazane, 1 part by weight silica and 0.06 part by weight of benzoyl peroxide. The resulting material is then heated at a temperature of about 150° C. to further cross-link the material and then post-cured at a temperature of about 250° C. for twenty-four hours to provide a complete cure. One particular use for these cross-linked materials is in the encapsulation of electrical apparatus such as printed circuit boards where the compounded cross-linked silazane is used to encapsulate the circuit board and the entire encapsulated assembly is heated at a first temperature of about 150° C. and a second temperature of about 250° C. to completely cure the encapsulated article.

What I claim as new and desire to secure by Letters Patent of the United States is:

1. A polymeric material comprising two silazane chains, each of which consists of a plurality of alternate silicon and nitrogen atoms, with each silicon atom in each of said chains containing two silicon-bonded monovalent hydrocarbon radicals, the nitrogen atoms of the first of said chains being attached to the nitrogen atoms of the second of said chains through a divalent hydrocarbon radical of at least two carbon atoms and free of aliphatic unsaturation.

2. A polymeric material comprising two silazane chains, each of which consists of a plurality of alternate silicon and nitrogen atoms with each silicon atom in each of said chains containing two silicon-bonded methyl radicals, the nitrogen atoms of the first of said chains being attached to the nitrogen atoms of the second of said chains through an ethylene radical.

3. A polymeric material comprising two silazane chains, each of which consists of a plurality of alternate silicon and nitrogen atoms with each silicon atom in each of said chains containing two silicon-bonded phenyl radicals, the nitrogen atoms of the first of said chains being attached to the nitrogen atoms of the second of said chains through an ethylene radical.

4. The polymeric material of claim 1 in which the monovalent hydrocarbon radicals are cyclohexyl radicals.

5. A polymeric material comprising two silazane chains, each of which consists of a plurality of alternate silicon and nitrogen atoms with each silicon atom in each of said chains containing two silicon-bonded monovalent hydrocarbon radicals, the nitrogen atoms of the first of said chains being attached to the nitrogen atoms of the second of said chains through an ethylene radical.

6. A polymeric material consisting essentially of the following recurring structural units:

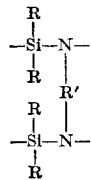

where R is a monovalent hydrocarbon radical and R' is a divalent hydrocarbon radical of at least two carbon atoms and free of aliphatic unsaturation.

7. A polymeric material having the formula:

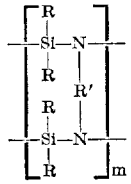

where R is a monovalent hydrocarbon radical, R' is a divalent hydrocarbon radical having at least two carbon atoms and being free of alipahtic unsaturation and $m$ has a value of from about 5 to 150.

8. The process of forming a cross-linked polymeric silazane having the formula:

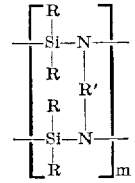

which comprises heating a polymeric diorganosilylamine having the formula:

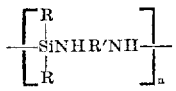

with a metal salt selected from the class consisting of $CuCl_2$, $NCl_2$, $ThCl_4$, and $CoCl_2$, where R is a monovalent hydrocarbon radical, R' is a divalent hydrocarbon radical having at least two carbon atoms and being free of aliphatic unsaturation and $m$ and $n$ have values of from about 5 to 150, inclusive.

9. The process of claim 8 in which R is methyl.
10. The process of claim 8 in which R is phenyl.
11. The process of claim 8 in which R' is ethylene.
12. The process of claim 8 in which R is methyl and R' is ethylene.
13. The process of claim 12 in which the metal chloride is $CuCl_2$.
14. The process of claim 12 in which the metal salt is $ThCl_4$.
15. The process of claim 12 in which the metal salt is $NiCl_2$.
16. The process of claim 12 in which the metal salt is $CoCl_2$.
17. The process of claim 8 in which R is methyl, R' is phenyl and the metal salt is $CuCl_2$.

References Cited in the file of this patent

UNITED STATES PATENTS 2,876,209    De Benneville et al. _____ Mar. 3, 1959

OTHER REFERENCES

Minne et al., Jour. Am. Chem. Soc., vol. 82, November 5, 1960, pp. 5625–30.

UNITED STATES PATENT OFFICE
CERTIFICATE OF CORRECTION

Patent No. 3,098,830            July 23, 1963

Eugene G. Rochow

It is hereby certified that error appears in the above numbered patent requiring correction and that the said Letters Patent should read as corrected below.

Column 12, line 22, for "$NCl_2$" read -- $NiCl_2$ --.

Signed and sealed this 25th day of February 1964.

(SEAL)
Attest:

ERNEST W. SWIDER
Attesting Officer

EDWIN L. REYNOLDS
Acting Commissioner of Patents